US012769307B2

(12) United States Patent
Choi et al.

(10) Patent No.: US 12,769,307 B2
(45) Date of Patent: Oct. 20, 2026

(54) METHOD AND SYSTEM FOR OPTIMIZING REINFORCEMENT-LEARNING-BASED AUTONOMOUS DRIVING ACCORDING TO USER PREFERENCES

(71) Applicants: NAVER CORPORATION, Seongnam-si (KR); NAVER LABS CORPORATION, Seongnam-si (KR)

(72) Inventors: Jinyoung Choi, Seongnam-si (KR); Jung-eun Kim, Seongnam-si (KR); Kay Park, Seongnam-si (KR); Jaehun Han, Seongnam-si (KR); Joonho Seo, Seongnam-si (KR); Minsu Kim, Seongnam-si (KR); Christopher Dance, Grenoble (FR)

(73) Assignees: NAVER CORPORATION, Seongnam-si (KR); NAVER LABS CORPORATION, Seongnam-si (KR)

( * ) Notice: Subject to any disclaimer, the term of this patent is extended or adjusted under 35 U.S.C. 154(b) by 270 days.

(21) Appl. No.: 17/657,878

(22) Filed: Apr. 4, 2022

(65) Prior Publication Data

US 2022/0229435 A1 Jul. 21, 2022

Related U.S. Application Data

(63) Continuation of application No. PCT/KR2020/011304, filed on Aug. 25, 2020.

(30) Foreign Application Priority Data

Oct. 24, 2019 (KR) ........................ 10-2019-0132808
Jan. 28, 2020 (KR) ........................ 10-2020-0009729

(51) Int. Cl.
*G05D 1/00* (2006.01)
*G05B 13/02* (2006.01)

(52) U.S. Cl.
CPC ......... *G05D 1/0088* (2013.01); *G05B 13/027* (2013.01); *G05D 1/0231* (2013.01); *G05D 1/0276* (2013.01); *G05D 1/0287* (2013.01)

(58) Field of Classification Search
None
See application file for complete search history.

(56) References Cited

U.S. PATENT DOCUMENTS 10,131,053 B1 * 11/2018 Sampedro .............. B25J 9/1666
10,926,408 B1 * 2/2021 Vogelsong ............... B25J 9/163
(Continued)

FOREIGN PATENT DOCUMENTS

CN 109409188 A * 3/2019 ........... G06V 10/454
JP 2007041723 A 2/2007
(Continued)

OTHER PUBLICATIONS

Biyik et al., "Batch Active Preference-Based Learning of Reward Functions", Conference on robot learning, Oct. 10, 2018 (Year: 2018).*
(Continued)

*Primary Examiner* — Kai Wang
(74) *Attorney, Agent, or Firm* — Greer, Burns & Crain, Ltd

(57) ABSTRACT

A method for optimizing autonomous driving includes applying different autonomous driving parameters to a plurality of robot agents in a simulation through an automatic setting by the system or a direct setting by a manager, so that
(Continued)

the robot agents learn robot autonomous driving; and optimizing the autonomous driving parameters by using preference data for the autonomous driving parameters.

7 Claims, 6 Drawing Sheets

(56) References Cited

U.S. PATENT DOCUMENTS

| | | | | |
|---|---|---|---|---|
| 11,579,619 | B2 * | 2/2023 | Kim | G05D 1/0217 |
| 2005/0125332 | A1 * | 6/2005 | Cliff | G06Q 40/04 705/37 |
| 2019/0232488 | A1 * | 8/2019 | Levine | B25J 9/161 |
| 2019/0232489 | A1 | 8/2019 | Pascanu et al. | |
| 2019/0286979 | A1 | 9/2019 | Harmer et al. | |
| 2019/0299407 | A1 * | 10/2019 | Grotmol | B25J 9/163 |
| 2019/0311298 | A1 * | 10/2019 | Kopp | G01C 25/00 |
| 2019/0392254 | A1 * | 12/2019 | Oh | G06N 7/01 |
| 2019/0392304 | A1 * | 12/2019 | Aliper | G06N 3/08 |
| 2020/0104650 | A1 * | 4/2020 | Huang | G06V 10/809 |
| 2021/0089834 | A1 * | 3/2021 | Wierstra | G06N 5/046 |
| 2021/0166715 | A1 * | 6/2021 | Bharitkar | G10L 17/04 |
| 2021/0325894 | A1 * | 10/2021 | Faust | G05D 1/0221 |

FOREIGN PATENT DOCUMENTS

| | | | |
|---|---|---|---|
| JP | 2019101907 | A | 6/2019 |
| KR | 101771643 | B1 | 8/2017 |
| KR | 1020180070103 | A | 6/2018 |
| KR | 1020190041831 | A | 4/2019 |
| KR | 1020190119225 | A | 10/2019 |
| WO | 2004033159 | A1 | 4/2004 |

OTHER PUBLICATIONS

E.Biyik et al., "Batch Active Preference-Based Learning of Reward Fuctions", Oct. 10, 2018.

D. Sadigh et al., "Active Preference-Based Learning of Reward Fuctions", Robotics: Science and systems XIII, Jul. 2, 2017.

P.Christiano et al., "Deep Reinforcement learning from human preferences", Jun. 12, 2017.

J.Choi et al., "Deep Reinforcement Learning of Navigation in a Complex and Crowded Environment with a Limited Field of View", May 20, 2019.

C. Bludell et al., "Weight Uncertainty in Neural Networks", May 20, 2015.

A. Wilson et al., "A Bayesian Approach for policy learning from Trajectory Preference Queries", Advanced in Neural information processing systems, Dec. 3, 2012.

EP Search Report issued in corresponding European patent application No. 20878770.5, dated Jul. 12, 2023.

Office Action issued in corresponding Japanese patent application No. 2022-519438, dated Apr. 4, 2023.

ISR issued in PCT/KR2020/011304, mailed Nov. 19, 2020.

* cited by examiner

FIG. 4

Algorithm 1: Training the Adaptable Navigation Policy

Initialize replay memory D, RL algorithm with network parameters $\theta_{RL}$, navigation-parameter distribution pw, number of agents $N_{agent}$, maximum episode length T;
while not converged do
    for agent $i = 1, 2, \ldots, N_{agent}$ do
        Sample navigation parameter $w_i$ from pw ;
        Initialize agent i with parameters $w_i$;
    end
    for timestep $t = 1, 2, \ldots, T$ do
        for agent $i = 1, 2, \ldots, N_{agent}$ do
            Execute action $a_t^i$ from agent i's policy;
            Observe $o_{t+1}^i$ and receive reward $r_t^i$;
            Store transition $(o_t^i, a_t^i, r_t^i, o_{t+1}^i, w_i)$ in D;
        end
        Update $\theta_{RL}$ using the RL algorithm and transition data from D;
    end
end

FIG. 7

Algorithm 2: Bayesian Optimization of the Navigation Parameter Using Preference Data

Given the trained adaptable agent $\pi_{adaptable}$;
Initialize the Bayesian neural network parameters $\theta_{BN}$;
Initialize empty datasets $D_{params}$, $D_{preference}$;
$W_{new} \leftarrow$ sample $N_{query}$ navigation parameters;
for iteration $i = 1, 2, \ldots, N_{iter}$ do
  $D_{params} \leftarrow D_{params} \cup W_{new}$;
  Calculate $\mu(f(w|\theta_{BN}))$, $\sigma(f(w|\theta_{BN}))$, $UCB(w|\theta_{BN})$ for all $w \in D_{params}$;
  for query $j = 1, 2, \ldots, N_{query}$ do
    Sample $w_1^j$ from the $W_{mean} \subseteq D_{params}$ having $N_{top}$ highest $\mu(f(w|\theta_{BN}))$;
    Sample $w_2^j$ from the $W_{UCB} \subseteq D_{params}$ having $N_{top}$ highest $UCB(w|\theta_{BN})$;
    Collect preference $w_{win}^j > w_{lose}^j$ using trajectories from $\pi_{adaptable}$;
    $D_{params} \leftarrow D_{preference} \cup \{w_{win}^j > w_{lose}^j$ using
  end
  Train $\theta_{BN}$ using $D_{preference}$ for $N_{update}$ steps;
  $W_{random} \leftarrow$ sample $N_{sample}$ navigation parameters;
  Calculate $UCB(w|\theta_{BN})$ for all $w \in W_{random}$;
  $W_{new} \leftarrow$ set of $w \in W_{random}$ having $N_{query}$ highest $UCB(w|\theta_{BN})$;
end
return $w \in D_{params}$ having the highest $\mu(f(w|\theta_{BN}))$;

METHOD AND SYSTEM FOR OPTIMIZING REINFORCEMENT-LEARNING-BASED AUTONOMOUS DRIVING ACCORDING TO USER PREFERENCES

CROSS-REFERENCE TO RELATED APPLICATIONS

This is a continuation application of International Application No. PCT/KR2020/011304, filed Aug. 25, 2020, which claims the benefit of Korean Patent Application Nos. 10-2019-0132808, filed Oct. 24, 2019 and 10-2020-0009729, filed Jan. 28, 2020.

BACKGROUND OF THE INVENTION

Field of Invention

One or more example embodiments of the present invention in the following description relate to autonomous driving technology of a robot.

Description of Related Art

An autonomous driving robot may acquire speed information and azimuth information using robot application technology that is widely used in the industrial field, for example, an odometry method, may calculate information about a travel distance and a direction from a previous position to the next position, and may recognize the position and the direction of the robot.

For example, an autonomous driving robot capable of automatically moving to a destination by recognizing absolute coordinates and an autonomous driving method thereof are disclosed in Korean Patent Registration No. 10-1771643 (registered on Aug. 21, 2017).

BRIEF SUMMARY OF THE INVENTION

One or more example embodiments provide technology for optimizing reinforcement learning-based autonomous driving according to a user preference.

One or more example embodiments also provide new deep reinforcement learning-based autonomous driving technology that may adapt to various parameters and make a reward without a retraining process.

One or more example embodiments also provide technology that may find an autonomous driving parameter suitable for a use case using a small number of preference data.

According to an aspect of at least one example embodiment, there is provided an autonomous driving learning method executed by a computer system. The computer system includes at least one processor configured to execute computer-readable instructions included in a memory, and the autonomous driving learning method includes learning robot autonomous driving by applying, by the at least one processor, different autonomous driving parameters to a plurality of robot agents in a simulation through an automatic setting by a system or a direct setting by a manager.

According to one aspect, the learning of the robot autonomous driving may include simultaneously performing reinforcement learning of inputting randomly sampled autonomous driving parameters to the plurality of robot agents.

According to another aspect, the learning of the robot autonomous driving may include simultaneously learning autonomous driving of the plurality of robot agents using a neural network that includes a fully-connected layer and a gated recurrent unit (GRU).

According to still another aspect, the learning of the robot autonomous driving may include using a sensor value acquired in real time from a robot and an autonomous driving parameter that is randomly assigned in relation to an autonomous driving policy as an input of a neural network for learning of the robot autonomous driving.

According to still another aspect, the autonomous driving learning method may further include optimizing, by the at least one processor, the autonomous driving parameters using preference data for the autonomous driving parameters.

According to still another aspect, the optimizing of the autonomous driving parameters may include applying feedback on a driving image of a robot to which the autonomous driving parameters are set differently.

According to still another aspect, the optimizing of the autonomous driving parameters may include assessing preference for the autonomous driving parameter through pairwise comparisons of the autonomous driving parameters.

According to still another aspect, the optimizing of the autonomous driving parameters may include modeling the preference for the autonomous driving parameters using a Bayesian neural network model.

According to still another aspect, the optimizing of the autonomous driving parameters may include generating a query for pairwise comparisons of the autonomous driving parameters based on uncertainty of a preference model.

According to an aspect of at least one example embodiment, there is provided a computer program stored in a non-transitory computer-readable record medium to implement the autonomous driving learning method on a computer system.

According to an aspect of at least one example embodiment, there is provided a non-transitory computer-readable record medium storing a program to implement the autonomous driving learning method on a computer.

According to an aspect of at least one example embodiment, there is provided a computer system including at least one processor configured to execute computer-readable instructions included in a memory. The at least one processor includes a learner configured to learn robot autonomous driving by applying different autonomous driving parameters to a plurality of robot agents in a simulation through an automatic setting by a system or a direct setting by a manager.

According to some example embodiments, it is possible to achieve learning effect in various and unpredictable real world and to implement an adaptive autonomous driving algorithm without data increase by simultaneously performing reinforcement learning in various environments.

According to some example embodiments, it is possible to model a preference that represents whether it is appropriate as a use case for a driving image of a robot and then to optimize an autonomous driving parameter using a small number of preference data based on uncertainty of a model.

BRIEF DESCRIPTION OF THE DRAWINGS

FIG. 4 illustrates an example of an adaptive autonomous driving policy learning algorithm according to an example embodiment.

FIG. 7 illustrates an example of an autonomous driving parameter optimization algorithm using preference data according to an example embodiment.

DETAILED DESCRIPTION OF THE INVENTION

Hereinafter, some example embodiments will be described with reference to the accompanying drawings.

The example embodiments relate to autonomous driving technology of a robot.

The example embodiments including disclosures herein may provide new deep reinforcement learning-based autonomous driving technology that may adapt to various parameters and make a reward without a retraining process and may find an autonomous driving parameter suitable for a use case using a small number of preference data.

Figure 1:
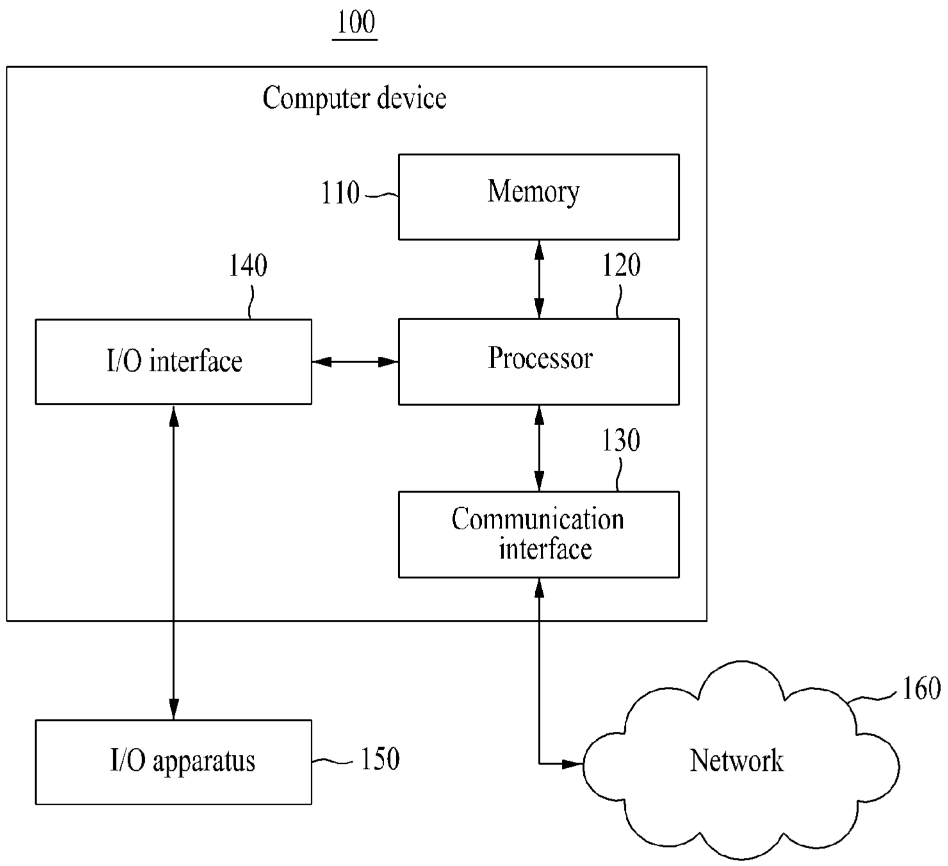
FIG. 1 is a block diagram illustrating an example of an internal configuration of a computer system according to an example embodiment.

FIG. 1 is a diagram illustrating an example of a computer system 100 according to an example embodiment. An autonomous driving learning system according to example embodiments may be implemented by the computer system 100.

Referring to FIG. 1, the computer system 100 may include a memory 110, a processor 120, a communication interface 130, and an input/output (I/O) interface 140 as components to perform an autonomous driving learning method according to example embodiments.

The memory 110 may include a permanent mass storage device, such as random access memory (RAM), read only memory (ROM), and disk drive, as a computer-readable recording medium. Here, the permanent mass storage device, such as ROM and disk drive, may be included in the computer system 100 as a permanent storage device separate from the memory 110. Also, an operating system (OS) and at least one program code may be stored in the memory 110. Such software components may be loaded to the memory 110 from another computer-readable record medium separate from the memory 110. The other computer-readable recording medium may include a floppy drive, a disk, a tape, a DVD/CD-ROM drive, a memory card, etc. According to other example embodiments, the software components may be loaded to the memory 110 through the communication interface 130 instead of the computer-readable recording medium. For example, the software components may be loaded to the memory 110 of the computer system 100 based on a computer program installed by files received over a network 160.

The processor 120 may be configured to process instructions of a computer program by performing basic arithmetic operations, logic operations, and I/O operations. The instructions may be provided from the memory 110 or the communication interface 130 to the processor 120. For example, the processor 120 may be configured to execute received instructions in response to a program code stored in the storage device such as the memory 110.

The communication interface 130 may provide a function for communication between the computer system 100 and other apparatuses over the network 160. For example, the processor 120 of the computer system 100 may transfer a request or an instruction created based on a program code stored in the storage device such as the memory 110, data, a file, etc., to the other apparatuses over the network 160 under the control of the communication interface 130. Inversely, a signal or an instruction, data, a file, etc., from another apparatus may be received at the computer system 100 through the network 160 and the communication interface 130 of the computer system 100. A signal or an instruction, data, etc., received through the communication interface 130 may be transferred to the processor 120 or the memory 110, and a file, etc., may be stored in a storage medium (the permanent storage device) further includable in the computer system 100.

The communication scheme is not limited and may include a near field wired/wireless communication scheme between devices as well as a communication scheme using a communication network (e.g., a mobile communication network, wired Internet, wireless Internet, a broadcasting network, etc.) includable in the network 160. For example, the network 160 may include at least one of network topologies that include a personal area network (PAN), a local area network (LAN), a campus area network (CAN), a metropolitan area network (MAN), a wide area network (WAN), a broadband network (BBN), and Internet. Also, the network 160 may include at least one of network topologies that include a bus network, a star network, a ring network, a mesh network, a star--bus network, a tree or hierarchical network, and the like. However, they are provided as examples only.

The I/O interface 140 may be a device used for interfacing with an I/O apparatus 150. For example, an input device of the I/O apparatus 150 may include a device, such as a microphone, a keyboard, a camera, a mouse, etc., and an output device of the I/O apparatus 150 may include a device, such as a display, a speaker, etc. As another example, the I/O interface 140 may be a device for interfacing with an apparatus in which an input function and an output function are integrated into a single function, such as a touchscreen. The I/O apparatus 150 may be configured as a single device with the computer system 100.

Also, in other example embodiments, the computer system 100 may include less or greater number of components than the number of components shown in FIG. 1. For example, the computer system 100 may include at least a portion of the I/O apparatus 150, or may further include other components, for example, a transceiver, a camera, various sensors, a database (DB), and the like.

Currently, a deep reinforcement learning method for autonomous driving is being actively studied, and autonomous driving technology of a robot using reinforcement learning is exhibiting higher performance than that of path planning-based autonomous driving.

However, the existing reinforcement learning method performs learning using a fixed value for a parameter such as a weight that represents a tradeoff between a maximum speed of the robot and a reward component (e.g., following a short path to a target and maintaining a large safety distance).

A desirable behavior of a robot differs depending on a use case and thus, may become an issue in a real scenario. For example, a robot deployed in a hospital ward needs to pay attention to avoid collision with sophisticated equipment and to not scare a patient, whereas top priority of a warehouse robot is to reach its target as quickly as possible. A robot trained using fixed parameters may not meet various requirements and may need to be retrained to fine-tune for each scenario. In addition, a desirable behavior of a robot interacting with a human frequently depends on preference of the human. Many efforts and cost are required to collect such preference data.

Therefore, there is a need for a method that may quickly and accurately predict an almost optimal parameter from a small number of human preference data as well as an agent adaptable to various parameters.

Figure 2:
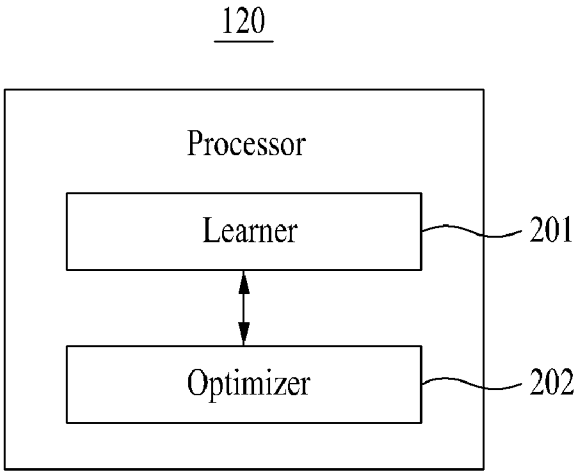
FIG. 2 is a block diagram illustrating an example of a component includable in a processor of a computer system according to an example embodiment.
Figure 3:
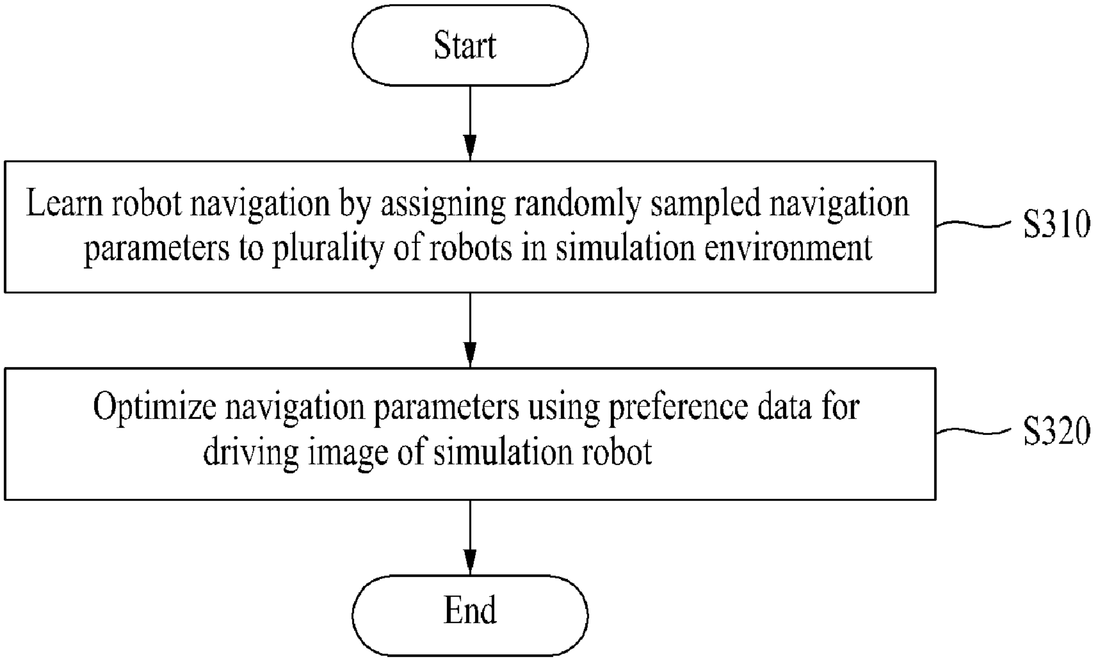
FIG. 3 is a flowchart illustrating an example of an autonomous driving learning method performed by a computer system according to an example embodiment.

FIG. 2 is a diagram illustrating an example of a component includable in the processor 120 of the computer system 100 according to an example embodiment, and FIG. 3 is a flowchart illustrating an example of an autonomous driving learning method performed by the computer system 100 according to an example embodiment.

Referring to FIG. 2, the processor 120 may include a learner 201 and an optimizer 202. Components of the processor 120 may be representations of different functions performed by the processor 120 in response to a control instruction provided by at least one program code. For example, the learner 201 may be used as a functional representation that controls the computer system 100 such that the processor 120 may learn autonomous driving of a robot based on deep reinforcement learning.

The processor 120 and the components of the processor 120 may perform operations S310 and S320 included in the autonomous driving learning method of FIG. 3. For example, the processor 120 and the components of the processor 120 may be implemented to execute an instruction according to the at least one program code and a code of an OS included in the memory. Here, the at least one program code may correspond to a code of a program implemented to process the autonomous driving learning method.

The autonomous driving learning method may not be performed in illustrated order. A portion of operations may be omitted or an additional process may be further included.

The processor 120 may load, to the memory 110, a program code stored in a program file for the autonomous driving learning method. For example, the program file for the autonomous driving learning method may be stored in a permanent storage device separate from the memory 110, and the processor 120 may control the computer system 100 such that the program code may be loaded from the program file stored in the permanent storage device to the memory 110 through a bus. Here, each of the processor 120 and the learner 201 and the optimizer 202 included in the processor 120 may be different functional representations of the processor 120 to execute operations S310 and S320 after executing an instruction of a corresponding portion in the program code loaded to the memory 110. For execution of operations S310 and S320, the processor 120 and the components of the processor 120 may process an operation according to a direct control instruction or may control the computer system 100.

Initially, a reinforcement learning-based autonomous driving problem may be formulated as follows.

The example embodiment considers a path-following autonomous task. Here, an agent (i.e., a robot) may move along a path to a destination and, here, the path may be expressed as a series of waypoints. When the agent reaches the last waypoint (destination), a new goal and waypoint may be given and a task is modeled using a Markov decision process (S, A, Ω, r, ptrans, pobs). Here, S represents states, A represents actions, Ω represents observations, r represents a reward function, ptrans represents conditional state-transition, and pobs represents observation probabilities.

A differential two-wheeled mobile platform model is used as an autonomous driving robot and a universal setting with a discount factor of $\gamma=0.99$ is applied.

(1) Autonomous driving parameters:

Many parameters affect an operation of a reinforcement learning-based autonomous driving agent. For example, autonomous driving parameter $w \in W \subseteq R^7$ including seven parameters is considered.

$$w=(w_{stop}, w_{socialLim}, w_{social}, w_{maxV}, w_{accV}, w_{maxW}, w_{accw}) \quad \text{[Equation 1]}$$

In Equation 1, $w_{stop}$ denotes a reward for collision or emergency stop, $w_{socialLim}$ denotes a minimum estimated time to collide with another agent, $w_{social}$ denotes a reward for violating $w_{socialLim}$, $w_{maxV}$ denotes a maximum linear speed, $w_{accV}$ denotes a linear acceleration, $w_{maxW}$ denotes an angular speed, and $w_{accW}$ denotes an angular acceleration.

The goal of the example embodiment is to train an agent that may adapt to various parameters w and may efficiently find a parameter w suitable for a given use case.

(2) Observations:

An observation form of the agent is represented as the following Equation 2.

$$o=(o_{scan}, o_{velocity}, o_{odometry}, o_{path}) \in \Omega \subseteq R^{27} \quad \text{[Equation 2]}$$

In Equation 2, $o^{scan} \subseteq R^{18}$ includes scan data of a distance sensor, such as a lidar. Data from −180° to 180° is temporarily stored at intervals of 20° and a minimum value is taken from each bin. A maximum distance that the agent may perceive is 3 m.

$o_{velocity} \in R^2$ includes a current linear speed and angular speed and is presented as Equation 3 as a change in a position of the robot related to a position in a previous timestep.

$$o_{odometry}=(\Delta x/\Delta t, \Delta y/\Delta t, \cos(\Delta\theta/\Delta t), \sin(\Delta\theta/\Delta t)) \quad \text{[Equation 3]}$$

In Equation 3, Δx, Δy, Δθ denotes position variance and heading variance of x and y, and Δt denotes a duration time of a single timestep.

Also, $o_{path}$ is the same as (cos(ϕ), sin(ϕ)). Here, ϕ denotes a relative angle to a next waypoint in a coordinate system of the robot.

(3) Actions:

An action of the agent represents a desired linear speed of the robot normalized to interval $[-0.2\ m/s, w_{maxV}]$ as a vector in $[-1, 1]^2$ and an angular speed is normalized to $[-w_{maxW}, w_{maxW}]$. When the robot executes an action, the angular speed of $\pm w_{accW}$ i is applied. In the case of increasing the speed, the linear acceleration may be $w_{accV}$. In the case of decreasing the speed, the linear acceleration may be −0.2 m/s.

(4) Reward function:

The reward function $r: S \times A \times W \rightarrow R$ represents a sum of five components as represented by the following Equation 4.

$$r=r_{base}+0.1 r_{waypointDist}+r_{waypoint}+r_{stop}+r_{social} \quad \text{[Equation 4]}$$

The reward $r_{base}=-0.01$ is given in every timestep to encourage the agent to reach a waypoint within a minimum time.

$r_{waypoint_{Dist}}=-\mathrm{sign}(\Delta d)\sqrt{|\Delta d|\Delta t}/w_{maxV}$ is set. Here $\Delta d=d_t-d_{t-1}$ and $d_t$ denotes a Euclidean distance from timestep t to the waypoint. A square root is used to reduce a penalty for a small deviation in a shortest path that is required for collision avoidance. If a distance between the agent and the current waypoint is less than 1 m, there is a reward of $r_{waypoint}=1$ and the waypoint is updated.

If an estimated collision time of the robot with an obstacle or another object to ensure a minimum safety distance in a simulation and a real environment is less than 1 second, if a collision occurs, or if a reward of $r_{stop}=w_{stop}$ is given, the robot is stopped by setting the linear speed to 0 m/s. The estimated collision time is calculated using a target speed given in a current motion and the robot is modeled to a square the side of 0.5 m using an obstacle point represented as $o_{scan}$.

When the estimated collision time for other agent is less than $w_{socialLim}$, the reward of $r_{social}=w_{social}$ is given. The estimated collision time is calculated for $r_{stop}$, except using not scan data but a position of the other agent within the range of 3 m. Since the position of the other agent is not included, the robot distinguishes between static obstacles of other agents using sequence of the scan data.

Referring to FIG. 3, an example of the autonomous driving learning method includes the following two operations.

In operation S310, the learner 201 simultaneously performs learning by randomly applying autonomous driving parameters to a plurality of robots in a simulation environment to learn an autonomous driving policy adaptable to a wide range of autonomous driving parameter without retraining.

The learner 201 may use sensor data and autonomous driving parameter as input to the neural network for autonomous driving learning. The sensor data refers to a sensor value acquired in real time from the robot and may include, for example, a time-of-flight (ToF) sensor value, current speed, odometry, a heading direction, an obstacle position, and the like. The autonomous driving parameter refers to a randomly assigned setting value and may be automatically set by a system or set by a manager. For example, the autonomous driving parameter may include a reward for collision, a safety distance required for collision avoidance and a reward for a safety distance, a maximum speed (a linear speed and a rotational speed), a maximum acceleration (a linear acceleration and a rotational acceleration), and the like. With the assumption that a parameter range is 1~10, the simulation may be performed using a total of ten robots from a robot with a parameter value of 1 to a robot with a parameter value of 10. Here, a "reward" refers to a value that is provided when a robot reaches a certain state, and the autonomous driving parameter may be designated based on preference, which is described below.

The learner 201 may simultaneously train a plurality of robots by assigning a randomly sampled parameter to each robot in the simulation. In this mariner, autonomous driving that fits various parameters may be performed without retraining and generalization may be performed even for a new parameter that is not used for existing learning.

For example, as summarized in an algorithm of FIG. 4, a decentralized multi-agent training method may be applied. For each episode, a plurality of agents may be deployed in a shared environment. To adapt the policy to various autonomous driving parameters, autonomous driving parameters of the respective agents may be randomly sampled from a distribution when each episode starts. In the case of a reinforcement learning algorithm, parameter sampling is efficient and stable and the policy with more excellent performance is produced.

Figure 5:
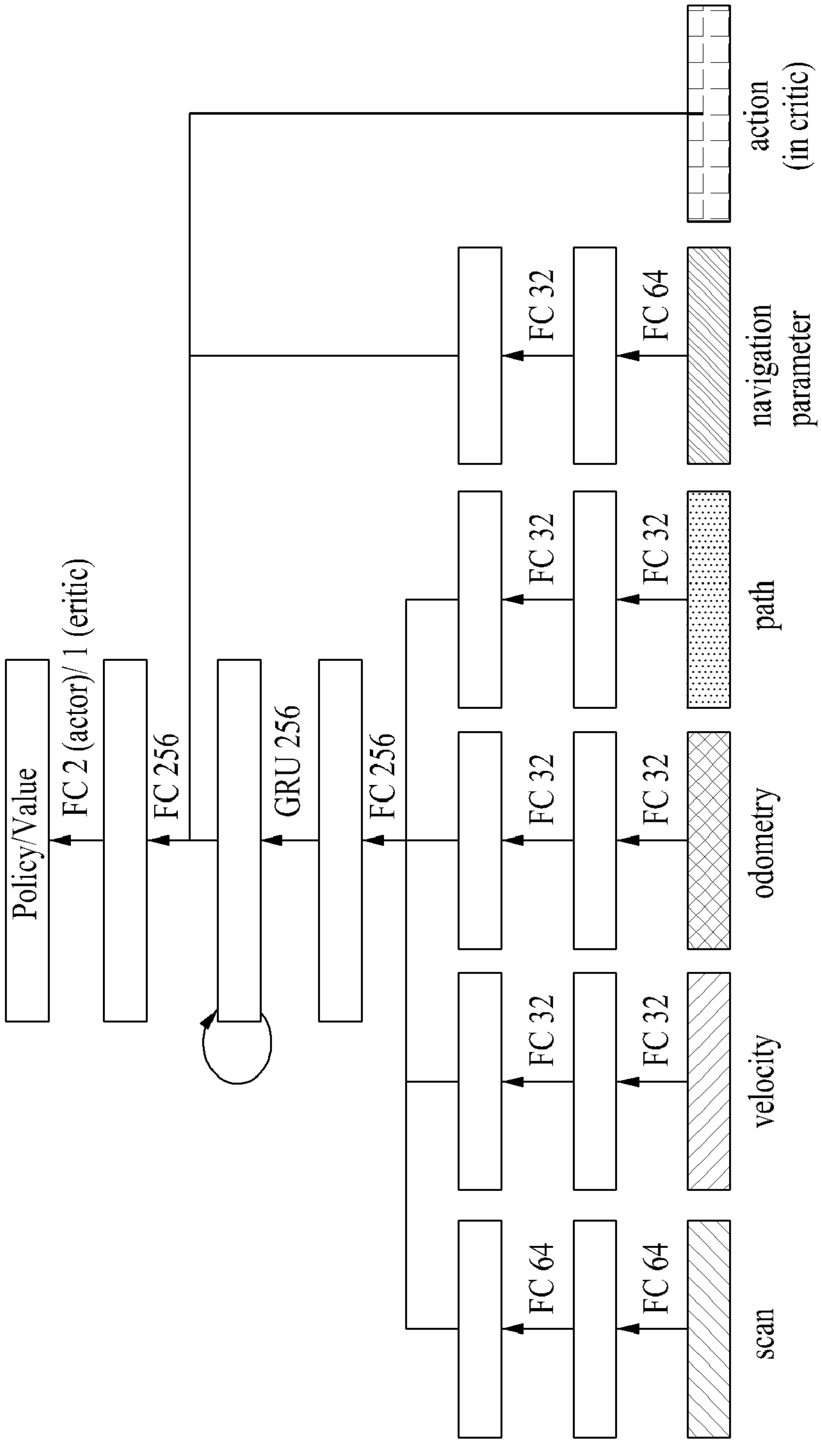
FIG. 5 illustrates an example of a neural network for adaptive autonomous driving policy learning according to an example embodiment.
Figure 6:
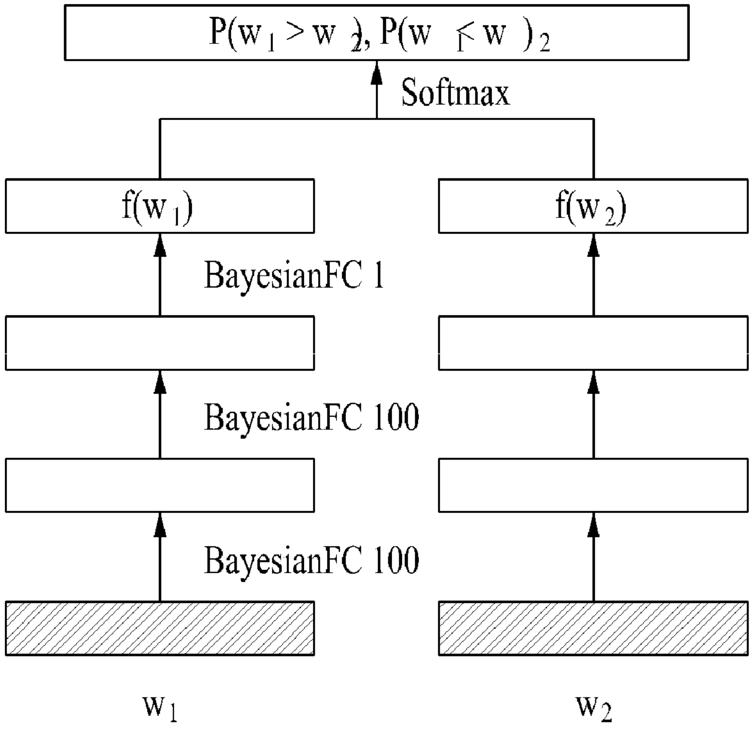
FIG. 6 illustrates an example of a neural network for utility function learning according to an example embodiment.

FIGS. 5 and 6 illustrate examples of a neural network architecture for autonomous driving learning according to an example embodiment.

The neural network architecture for autonomous driving learning according to an example embodiment employs an adaptive policy learning structure (FIG. 5) and a utility function learning structure (FIG. 6). Here, FC represents a fully-connected layer, BayesianFC represents a Bayesian fully-connected layer, and merged divergence represents a concatenation. Utility functions $f(w_1)$ and $f(w_2)$ are calculated using a shared weight.

Referring to FIG. 5, an autonomous driving parameter of an agent is provided as an additional input to a network. A GRU that requires a relatively small computation compared to long short-term memory (LSTM) models and, at the same time, provides competitive performance is used to model temporal dynamics of the agent and an agent environment.

The example embodiments may achieve learning effect in various and unpredictable real world by simultaneously training robots in various settings in a simulation and by simultaneously performing reinforcement learning in various inputs. Although a plurality of randomly sampled parameters is used as settings for autonomous driving learning, a total data amount required for learning is the same as or similar to a case of using a single fixed parameter. Therefore, an adaptive algorithm may be generated with a small amount of data.

Referring again to FIG. 3, in operation S320, the optimizer 202 may optimize the autonomous driving parameters using preference data for a driving image of a simulation robot (i.e., a video of a moving robot). When a human views the driving image of the robot and gives feedback, the optimizer 202 may optimize the autonomous driving parameters for the user preference by applying a feedback value and thereby learning the autonomous driving parameters in a way preferred by humans.

The optimizer 202 may use a neural network that receive and applies feedback from a human about driving images of robots with different autonomous driving parameters. Referring to FIG. 6, an input of the neural network is an autonomous driving parameter w and an output of the neural network is a utility function f(w) as a score according to a softmax calculation. That is, softmax is learned as 1 or 0 according to user feedback and a parameter with the highest score is found.

Although there is an agent adaptable to the wide range of autonomous driving parameters, an autonomous driving parameter optimal for a given use case needs to be found. Therefore, proposed is a new Bayesian approach method of optimizing an autonomous driving parameter using preference data. The example embodiment may assess preference through easily derivable pairwise comparisons.

For example, a Bradley-Terry model may be used for model preference. A probability that an autonomous driving parameter $w_1 \in W$ is preferred over $w_2 \in W$ is represented as Equation 5.

$$P(w_1 \succ w_2)=P(t_1 \succ t_2)=1/(1+\exp(f(w_2)-f(w_1))) \quad \text{[Equation 5]}$$

In Equation 5, $t_1$ and $t_2$ represent robot trajectories collected using $w_1$ and $w_2$, $w_1 \succ w_2$ represents that $w_1$ is preferred over $w_2$, and $f:W \rightarrow R$ denotes a utility function. For accu a e preference assessment, the trajectories $t_1$ and $t_2$ are collected using the same environment and waypoint. The utility function f(w) may be fit to preference data, which is used to predict environment settings for a new autonomous driving parameter.

For active learning of a preference model, a utility function $f(w|\theta_{BN})$ is learned in the Bayesian neural network with a parameter $\theta_{BN}$. In particular, a number of queries may be minimized by using an estimate about prediction uncertainty to actively create a query.

As shown in an algorithm of FIG. 7, the neural network (FIG. 6) is trained to minimize a negative log-likelihood (Equation 6) of the preference model.

$$\text{loss}(\theta_{BN})=\log(1+\exp(f(w_{lose}|\theta_{BN})-f(w_{win}|\theta_{BN})))\quad\text{[Equation 6]}$$

In each iteration, the network is trained by each timestep $N_{update}$, starting with the parameter $\theta_{BN}$ from a previous timestep. For example, a modified upper-confidence bound (UCB) may be used to actively sample a new query through settings as in Equation 7.

$$\text{UCB}(w|\theta_{BN})=\mu(f(w|\theta_{BN}))+\sigma(f)(w|\theta_{BN}))\quad\text{[Equation 7]}$$

In Equation 7, $\mu(f(w|\theta_{BN}))$ and $\sigma(f(w|\theta_{BN}))$ denote mean and deviation of $f(w|\theta_{BN})$ that is calculated with forward pass $N_{forward}$ of the network. In a simulation environment, coefficient $\sqrt{\log(\text{time})}$ that appears in front of $\sigma(f(w|\theta_{BN}))$ is omitted.

A trajectory of the robot is generated using autonomous driving parameter $N_{query}$ with the highest $\text{UCB}(w|\theta_{BN})$ among $N_{sample}$ uniformly sampled autonomous driving parameters. A new preference query of $N_{query}$ is actively generated. To this end, $\mu(f(w|\theta_{BN}))$ and $\text{UCB}(w|\theta_{BN})$ are calculated for all $w \in D_{params}$ that is a set of all autonomous driving parameters. Here, it is assumed that a sample set uses $W_{mean}$ as $\mu(f(w|\theta_{BN}))$ of highest Ntop in $D_{params}$ and $W_{UCB}$ as $\text{UCB}(w|\theta_{BN})$ of highest Ntop in $D_{params}$. Each preference query includes an autonomous driving parameter pair ($w_1$, $w_2$) in which $w_1$ and $w_2$ and are uniformly sampled in $W_{means}$ and $W_{UCB}$.

That is, the optimizer 202 may show users two image clips of a robot that drives at different parameters, may investigate preference for which image is more suitable for a use case, and may perform a modeling of the preference, and thereby create new clips based on uncertainty of a model. In this manner, the optimizer 202 may find a parameter with high satisfaction using a small number of preference data. For each calculation, connection strength of the neural network is sampled in a predetermined distribution. In particular, by inducing learning using an input with high uncertainty of a prediction result in a process of actively generating a query using a Bayesian neural network, a number of queries required for overall learning may be effectively reduced.

According to some example embodiments, it is possible to achieve learning effect in various and unpredictable real world and to implement an adaptive autonomous driving algorithm without data increase by simultaneously performing reinforcement learning in various environments. According to some example embodiments, it is possible to model a preference that represents whether it is appropriate as a use case for a driving image of a robot and then to optimize an autonomous driving parameter using a small number of preference data based on uncertainty of a model.

The apparatuses described herein may be implemented using hardware components, software components, and/or a combination of the hardware components and the software components. For example, the apparatuses and the components described herein may be implemented using a processing device including one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A robot autonomous driving learning method based on deep reinforcement learning executed by a computer system having at least one processor configured to execute computer-readable instructions included in a memory, the method comprising:

applying a plurality of different autonomous driving parameters simultaneously to a plurality of robot agents in a simulation by randomly assigning setting values of the autonomous driving parameters to the plurality of robot agents by a system or a manager, to enable the plurality of robot agents to perform autonomous driving that fits the assigned autonomous driving parameters without retraining;

acquiring, in real time, a sensor value relating to a movement of a robot from a robot agent of the plurality of robot agents applied with the different autonomous driving parameters;

inputting the sensor value and an autonomous driving parameter of the different autonomous driving parameters assigned to the robot agent to a neural network comprising a plurality of neural network parameters for learning an adaptable robot autonomous driving policy to perform autonomous driving, where the learned adaptable robot autonomous driving policy is adaptable to various autonomous driving parameters without retraining;

updating the plurality of neural network parameters to train the robot agent on the adaptable robot autonomous driving policy; and after said updating the plurality of neural network parameters, optimizing the autonomous driving parameters by applying a feedback from a human viewing two driving images of a robot to which the autonomous driving parameters are set differently for each of the two driving images respectively, wherein the robot in said each of the two driving images is the trained robot agent, wherein the optimizing of the autonomous driving parameters comprises:

modeling a preference for the autonomous driving parameters using a Bayesian neural network, and generating a query for obtaining the feedback from the human by selecting the autonomous driving parameters corresponding to the two driving images based on an uncertainty estimate of the modeled preference to minimize a number of queries.

2. The robot autonomous driving learning method of claim 1, wherein the learning of the robot autonomous driving comprises simultaneously performing reinforcement learning of inputting randomly sampled autonomous driving parameters to the plurality of robot agents.

3. The robot autonomous driving learning method of claim 1, wherein the neural network includes a fully-connected layer and a gated recurrent unit (GRU).

4. A non-transitory computer-readable recording medium storing a computer program enabling a computer to implement the robot autonomous driving learning method according to claim 1.

5. A computer system for executing a robot autonomous driving learning method based on deep reinforcement learning, comprising:

at least one processor configured to execute computer-readable instructions included in a memory, wherein the at least one processor executes the steps comprising:

applying a plurality of different autonomous driving parameters simultaneously to a plurality of robot agents in a simulation by randomly assigning predetermined setting values of the autonomous driving parameters to the plurality of robot agents by a system or a manager, to enable the plurality of robot agents to perform autonomous driving that fits the assigned autonomous driving parameters without retraining;

acquiring, in real time, a sensor value relating to a movement of a robot from a robot agent of the plurality of robot agents applied with the different autonomous driving parameters;

inputting the sensor value and an autonomous driving parameter of the different autonomous driving parameters assigned to the robot agent to a neural network comprising a plurality of neural network parameters for learning an adaptable robot autonomous driving policy to perform autonomous driving, where the learned adaptable robot autonomous driving policy is adaptable to various autonomous driving parameters without retraining;

updating the plurality of neural network parameters to train the robot agent on the adaptable robot autonomous driving policy; and after said updating the plurality of neural network parameters, optimizing the autonomous driving parameters by applying a feedback from a human viewing two driving images of a robot to which the autonomous driving parameters are set differently for each of the two driving images respectively, wherein the robot in said each of the two driving images is the trained robot agent, wherein the optimizing of the autonomous driving parameters comprises:

modeling a preference for the autonomous driving parameters using a Bayesian neural network, and generating a query for obtaining the feedback from the human by selecting the autonomous driving parameters corresponding to the two driving images based on an uncertainty estimate of the modeled preference to minimize a number of queries.

6. The computer system of claim 5, wherein the processor is configured to simultaneously perform reinforcement learning of inputting randomly sampled autonomous driving parameters to the plurality of robot agents.

7. The computer system of claim 5, wherein the neural network includes a fully-connected layer and a gated recurrent unit (GRU).

* * * * *